Oct. 30, 1962 A. TREMBLAY 3,060,768
SAW FILING GUIDE
Filed Dec. 27, 1960 2 Sheets-Sheet 1

INVENTOR
Alphonse TREMBLAY
BY
Pierre Lesperance
PATENT AGENT

Oct. 30, 1962     A. TREMBLAY     3,060,768
SAW FILING GUIDE

Filed Dec. 27, 1960     2 Sheets–Sheet 2

INVENTOR
Alphonse TREMBLAY
BY Pierre Lesperance
PATENT AGENT 3,060,768
SAW FILING GUIDE
Alphonse Tremblay, La Decharge, R.R. 4, St. Charles
Borromee, Quebec, Canada
Filed Dec. 27, 1960, Ser. No. 78,503
1 Claim. (Cl. 76—36)

The present invention relates to improvements in guides for use in filing the teeth of chain saws and more particularly to improved guides of the type described in U.S. Patent No. 2,871,728 of March 2, 1959, by the same inventor.

One important object of the present invention resides in the provision of a guide of the character described of simplified construction for filing the cutter teeth and the raker teeth to absolutely uniform height respectively throughout the length of the chain saw without having to make any adjustment in the guide, a change of adjustment being effected only before the succeeding sharpening operation.

Yet another important object of the present invention is the provision of a guide of the character described which only uses the cutter teeth as reference points for the adjustment of the guide on the chain saw.

Still another important object of the present invention is the provision of a novel guide of the character described which has simple means for converting the guide from adjustment to file the teeth for winter sawing to summer sawing.

Still another important object of the present invention is the provision of a guide of the character described which is arranged for filing chain saws of different makes in which the distance between successive cutter teeth varies from one make to another.

Another object of the invention resides in the provision of a saw filing guide adapted to fit the teeth of chain saws having guide blades of various curvatures.

The foregoing and other important objects of the present invention will become more apparent during the following disclosure and by referring to the drawings, in which.

Figure 1:
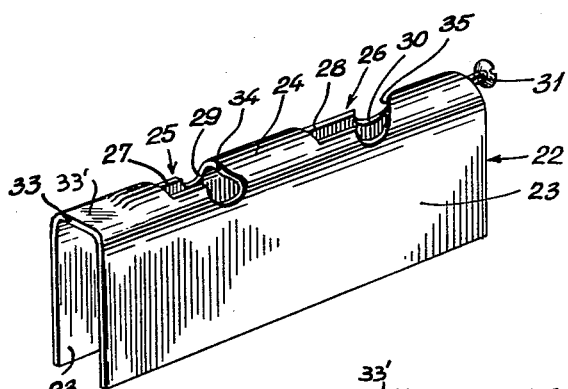
FIGURE 1 is a perspective view of a first embodiment of the guide of the present invention.

Referring now more particularly to the drawings in which like reference characters indicate like elements throughout, the numeral 10 indicates a portion of the guide blade of a chain saw on the peripheral edge 11 of which rides the chain saw itself which is built up of a series of links including single links 12 having a driving gear engaging tail entering a groove (not shown) made in blade 10, and alternating with double links 14 and 16 which ride at each side of said groove. Every other pair of the double links 16 carries a cutter tooth 18 and a raker tooth 20. The cutter teeth 18 have diagonally disposed cutting edges 21 which incline in alternate tooth to one side and the other of the saw.

Figure 2:
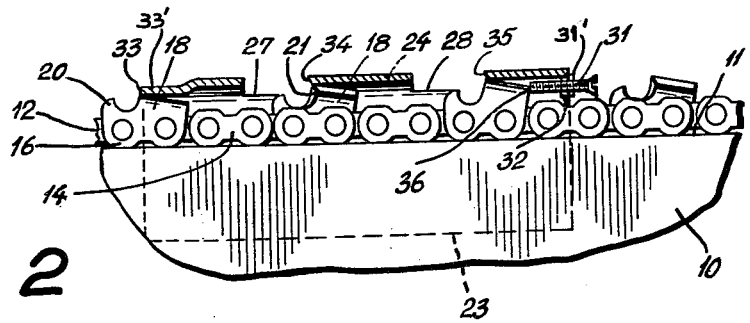
FIGURE 2 is a side elevation of a portion of a chain saw showing also a vertical longitudinal section on the median line of the guide in accordance with the present invention.
Figure 3:
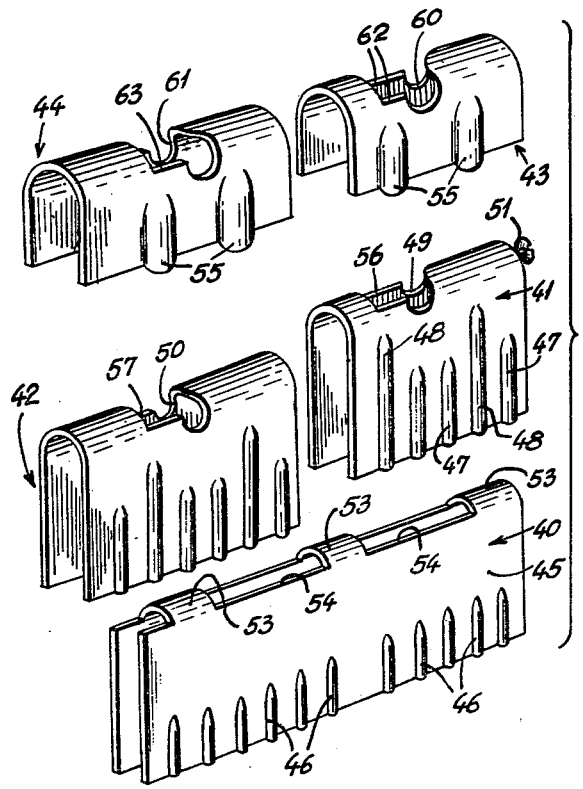
FIGURE 3 is an exploded perspective view of a second embodiment of the guide.

In accordance with a first embodiment of the invention, illustrated in FIGURES 1 and 2, the guide is formed of a body member 22 having an inverted U-shape cross-section forming straight parallel side legs 23 joined by a semi-circular bight portion 24.

Spaced longitudinally of the bight portion 24 a distance equal to the distance between two successive cutter teeth 18 are front and back notches 25 and 26 each having a relatively shallow portion defined by horizontal and aligned straight edges 27 and 28, said shallow portion merging into a deeper portion 29 and 30 respectively which is defined by curved edges for receiving a cylindrical file at an angle with respect to the long axis of the guide. The two notches 29 and 30 extend thus diagonally, being alternately inclined in one direction and in the other to conform to the alternate inclination of the cutting edges 21 of two successive cutter teeth 18.

The rear end of the guide member is provided with an adjusting screw 31 extending longitudinally just underneath the bend 24 and in threaded engagement in a lug 32 welded or otherwise secured to the guide member. The screw 31 is locked in adjusted position by lock nut 31'. The front end of the guide member indicated at 33 contacts the inclined backing portion of the cutter tooth immediately forward of the cutter tooth engaging notch 29. The front end portion of the guide member is depressed as shown at 33' with respect to the bight portion 24.

The device is used as follows: The device is placed in straddling position over the chain saw and the blade 10 with the side legs 23 overlying the two outer surfaces of the blade 10 and with the bight portion 24 overlying the chain saw. The device is adjusted longitudinally of the blade 10 into position in which bight portion 24 contacts two consecutive cutter teeth 18 to rest thereon, while bight portion 33' rests on the next forward tooth 18. The bight portion 33' compensates for the longitudinal curvature of the blade 10. The adjusting screw 31 abuts the rear end of the rearmost cutting teeth. Due to the fact that the spacing between the front end 33 and the edges 34 and 35 of the notches 29 and 30 is equal to the spacing between the successive cutter teeth, it will be understood that the guide rests on the said cutting teeth in exactly level position with respect to the chain saw and more specifically they contact the cutting teeth at an equal height. This height is determined by the adjusted position of screw 31 and determines in turn the height of the horizontal edges 27 and 28 and the distance of the deep slot portions 29 and 30 from the back edge 36 of the cutter teeth 18. Due to the fact that the guide contacts three cutter teeth it is firmly held in position and will not tilt and it will enable to file down the raker teeth 20 to exactly equal height and also to file back the cutting edges 21 of the cutter teeth to exactly the same distance from the back edge 36 and thereby to the same height, thus very uniform sharpening of the cutting teeth and raker teeth of the entire chain saw is obtained.

It will be noted that the notches 29 and 30 have their edges 34 and 35 forwardly and upwardly inclined to enable sharpening of the cutting edges 21 at the required bevel.

Once a pair of right and left hand cutting teeth and the associated raker teeth have been sharpened or filed down, the chain saw is displaced longitudinally of the blade and guide the extent of two cutting teeth for sharpening the next teeth, and so on for the entire chain saw.

The sharpening device in accordance with the first embodiment can be used with different makes of mechanical chain saws and also for winter and summer sharpening. As noted above, the recessed bight portion 33' at the front end of the device takes care of the longitudinal curvature of the saw blade, and the device can always be adjusted longitudinally of saw blades of different curvatures so as to find a position in which three successive cutting teeth abut against the bight portions 24 and 33'. The same sharpening device may also be used with different makes of chain saws in which the spacing between the edges 34 and 35 of the notches 29 and 30 of the device. However, in this case it is necessary to re-adjust the adjusting screw 31 after sharpening of each tooth.

It is known that the cutting edges of the cutting teeth must be preferably inclined at different angles for summer or winter sawing, for instance, for summer sawing, the cutting edges are set at about 35° while for winter operation, they are set at about 30°. However, with the embodiment of FIGURE 1, it is possible with a little practice for the operator to not exactly follow the guiding edges of the notches 29 and 30; thus supposing the device of FIGURE 1 is set at 35° inclination for summer sawing, it is possible to direct the file more nearly perpendicular to the guide file at about 30° angle.

The second embodiment of the invention is illustrated in FIGURES 3 to 7 inclusive and is designed in the same manner as the first embodiment but makes provision for easier adaptation to different makes of chain saws and also for winter and summer sharpening of the chain saw. The second embodiment is formed of five body members of inverted U-shape cross-section and adapted to nest one within the others. More specifically, there is an inner member 40 adapted to nest within a pair of intermediate members 41 and 42 and the latter are adapted to nest within a pair of outer members 43 and 44.

Figure 4:
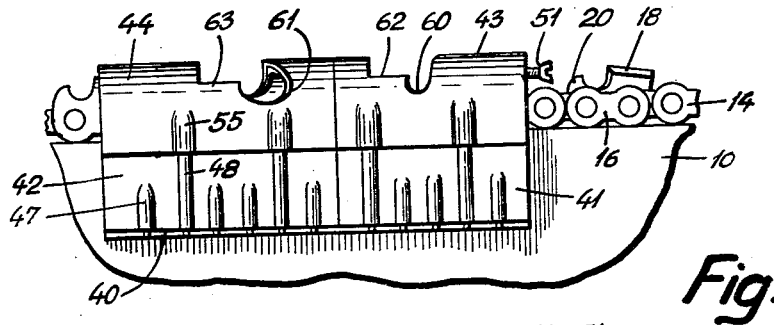
FIGURE 4 is a side elevation of a portion of the chain saw and the guide in accordance with the second embodiment.
Figure 5:
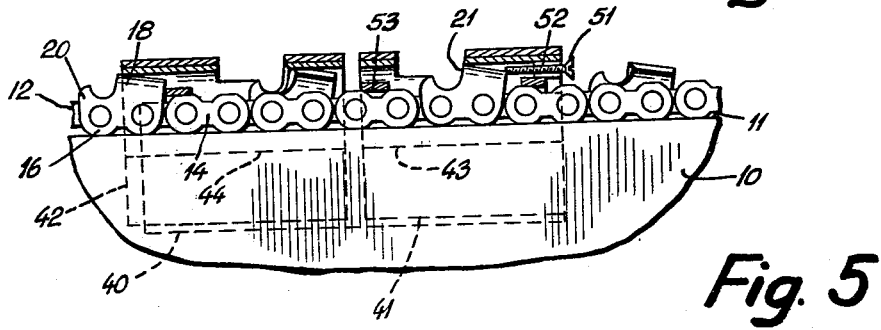
FIGURE 5 is a view similar to that of FIGURE 4, but showing a vertical longitudinal section on the median line of the second embodiment in a differently adjusted position with respect tto FIGURE 4.

The inner member 40 consists of flat parallel side legs 45 provided with a plurality of spaced ribs 46 adapted to receive the inner grooves defined by the short and long ribs 47 and 48 of the intermediate members 41 and 42, such that the two members 41 and 42 may be positioned over the inner member 40 in side by side relation in any one of several longitudinally adjusted positions including the position as shown in FIGURE 4, in which the two members are contiguous, and the intermediate position of FIGURE 5 in which member 42 has been displaced the extent of one rib, and including other adjusted more spaced apart positions so as to obtain exact positioning of the alternately inclined notches 49 and 50 of the intermediate members 41 and 42 with respect to the cutting edges 21 of the cutting teeth 18 in accordance with different makes of saws in which the distance between successive cutting edges may vary from one make to another.

The longitudinal positioning of the assembled members 41, 42 and 40 on the saw is obtained by means of an adjusting screw 51 corresponding to screw 31 of the first embodiment and threadedly engaging a lug 52 made just underneath the bend of the member 41 at the rear end thereof, said adjusting screw 51 adapted to engage the back edge 36 of a cutter tooth as clearly shown in FIGURE 5. The inner member 40 has relatively narrow bend portions 53 adapted to overlie the links 14 over limited areas and defining long slots 54 so as to enable longitudinal displacement of the bend portions 53 between the cutter and raker teeth.

The inner member 40 does not support the guide assembly on the saw but serves only to maintain the two intermediate members 41 and 42 in longitudinally spaced adjusted position.

Figure 7:
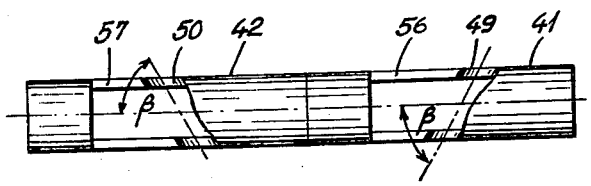
FIGURE 7 is a top plan view of the portion of the guide used for summer filing.

The notches 49 and 50 of the two members 41 and 42 correspond to the notches 26 and 25 of the first embodiment. As shown in FIGURE 7, the inclination of the axis of the deeper portion of said notches with respect to the long axis of the guide elements is set at about 35° and the horizontal edges 56 and 57 of the notches are set so as to file down the raker tooth 20 to the extent of about 30 thousandths of an inch with respect to the cutting edge 21. This adjustment is for summer sawing of the trees, however, these requirements change for winter operation, that is why in accordance with the present invention, the outer members 43 and 44 are inserted over the intermediate members 41 and 42. Members 43 and 44 are each provided with ribs 55 defining grooves adapted to receive the longer ribs 48 of the intermediate members 41 and 42, so as to register with said latter members.

Figure 6:
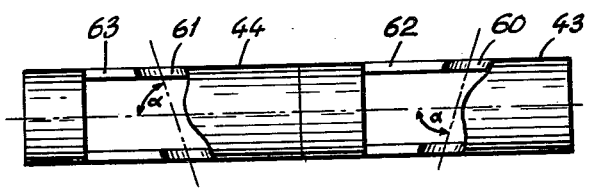
FIGURE 6 is a top plan view of the portion of the guide for winter filing.

As shown in FIGURE 6, the angle α is greater than the corresponding angle β of members 41 and 42. Thus notches 60 and 61 have their axis more nearly perpendicular with respect to the long axis of the outer guide members than the similar axis of the notches 49 and 50 of the intermediate members 41 and 42. The inclination is about 30° with respect to the long axis of the members. Similarly, the horizontal edges 62 and 63 are higher than the similar edges of the intermediate members so as to obtain a vertical distance between the top of the raker teeth and the cutting edges of the cutter teeth of about 25 thousandths of an inch for winter sawing.

Thus, to convert the device from summer to winter sharpening it is only necessary to add the outer members 43 and 44 on top of intermediate members 41 and 42. The assembly of the intermediate and outer members can be displaced longitudinally on the inner member 40 to adjust for chain saws of various makes. As in the first embodiment, adjusting screw 51 is adjusted just before sharpening of the teeth of the chain saw in accordance with the degree of wear.

Obviously the embodiment of FIGURE 1 may be made for summer or for winter filing.

The teeth 18 are filed with a round file and preferably in a direction away from the lateral portion of the cutting edge so as to eliminate any wire edge.

As noted previously the cutting edges 21 are filed back to equal and uniform distances from the back edge 36 of the cutter teeth 18; this holds true even if there is some slack or looseness in the saw chain as this slack is compensated for by the backward pressure exerted by the file on the cutter teeth being filed in the front notch of the guide.

While preferred embodiments in accordance with the present invention have been illustrated and described, it is understood that various modifications may be resorted to without departing from the spirit and scope of the appended claim.

What I claim is:

A filing guide for chain saws having cutter and raker teeth, comprising a body member bent on a longitudinal line to provide a U-shape cross-section defining a curved bight and a pair of depending parallel legs, said member adapted to engage chain saw with the bight resting directly on the cutter teeth and with the side legs extending on each side of the blade of the chain saw carrying said chain, an adjusting screw longitudinally mounted at one end of said body member underneath the bight and engageable with the back edge of a cutter tooth to longitudinally displace and adjust the position of said body member with respect to the cutter teeth, the bight of said body member being provided with spaced notches forming file guides, each notch having a shallow portion merging into a deeper portion, each shallow portion being defined by two opposite straight horizontal edges adapted to be disposed opposite a raker teeth of the chain saw, the deeper portions of the notches extending diagonally across the bight at opposite angles and adapted to register with the cutting edge of a cutter tooth of the chain saw, the notches being spaced a distance equivalent to the distance between two adjacent cutter teeth, and the end portion of said body member opposite to the end provided with said adjusting screw forming an inside boss protruding inwardly between said two legs and having an edge terminating at a distance from the edge of the deeper portion of the adjacent notch equal to the distance between said last named edge and the corresponding edge of the next notch.

References Cited in the file of this patent
UNITED STATES PATENTS

| | | |
|---|---|---|
| 2,855,808 | Samson | Oct. 14, 1958 |
| 2,871,728 | Tremblay | Feb. 3, 1959 |

FOREIGN PATENTS

| | | |
|---|---|---|
| 587,303 | Canada | Nov. 17, 1959 |